(12) United States Patent
Ehrecke

(10) Patent No.: US 6,397,571 B1
(45) Date of Patent: Jun. 4, 2002

(54) COMBINE ENGINE OUTPUT CONTROLLED BY HARVESTING ASSEMBLY

(75) Inventor: Kevin Laverne Ehrecke, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/783,655

(22) Filed: Feb. 14, 2001

(51) Int. Cl.⁷ .............................................. A01D 75/28
(52) U.S. Cl. .............................. 56/10.2 R; 56/DIG. 15; 460/1
(58) Field of Search .................. 340/684, 459; 56/10.2 R, 10.2 A, 13.5, 14.6, DIG. 15; 460/1, 6

(56) References Cited

U.S. PATENT DOCUMENTS

| | | | |
|---|---|---|---|
| 4,009,556 A | * 3/1977 | Molzahn | 56/10.7 |
| 4,542,802 A | * 9/1985 | Garvey et al. | 180/306 |
| 4,934,985 A | * 6/1990 | Strubbe | 460/4 |
| 4,967,544 A | 11/1990 | Ziegler et al. | 56/10.2 |
| 5,878,557 A | 3/1999 | Wyffels et al. | 56/13.5 |
| 6,073,428 A | * 6/2000 | Diekhans | 56/10.2 R |
| 6,213,870 B1 | * 4/2001 | Satzler | 460/6 |

FOREIGN PATENT DOCUMENTS

DE 0 631 906 1/1995

* cited by examiner

*Primary Examiner*—Robert E. Pezzuto
*Assistant Examiner*—Arpád Fábián Kovács

(57) ABSTRACT

The combine of the present invention is provided with an internal combustion engine. An electronic engine controller is used to monitor and control the operation of the engine. The electronic engine controller stores at least two power curves for controlling the engine. The first power curve has a higher horsepower output than the second power curve. A harvesting assembly detector signals the electronic engine controller with a corn head signal if a corn head is mounted to the combine, or a grain platform signal if a grain platform is mounted to the combine. If a corn head is mounted to the combine the electronic engine controller derates the engine and works on the second power curve. If the electronic engine controller receives a grain platform signal, the electronic engine controller works on the higher horsepower first power curve.

8 Claims, 2 Drawing Sheets

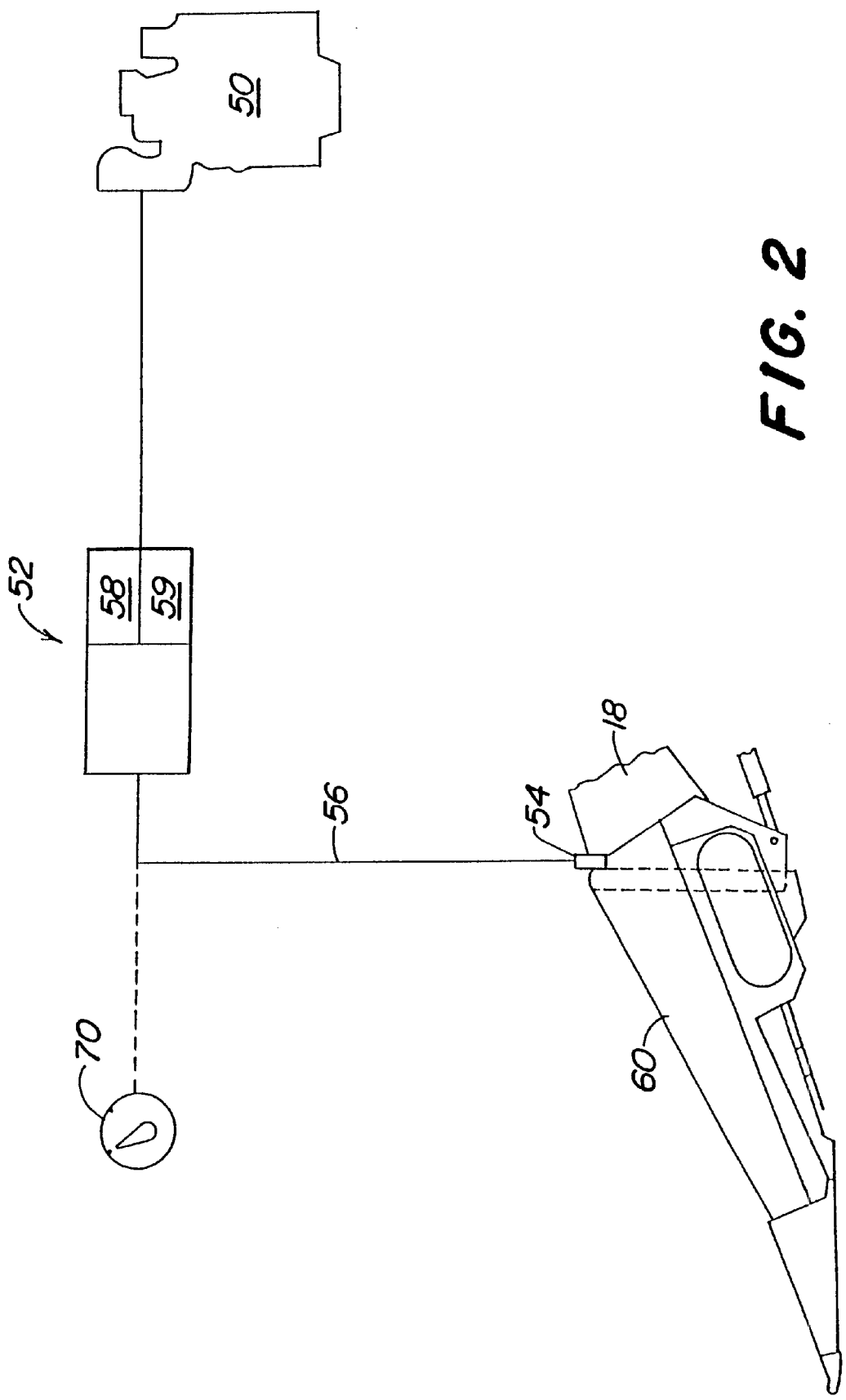

COMBINE ENGINE OUTPUT CONTROLLED BY HARVESTING ASSEMBLY

BACKGROUND OF THE INVENTION

1. Field of the Invention

The invention is directed to a combine powered by an internal combustion engine that is controlled by an electronic engine controller. The electronic engine controller operates the engine in accordance with a first or second power curve. The first power curve is used when the combine is equipped with a grain platform and the second power curve is used when the combine is equipped with a corn head.

2. Description of the Prior Art

Combines are large agricultural machines used to harvest, thresh, separate and clean an agricultural crop. Internal combustion engines are used to power the combine. Combines are provided with a grain tank for temporarily storing clean grain before it is unloaded to a grain cart or truck by an unloading auger. These machines are usually self propelled and may be provided with additional crop processing assemblies like straw choppers and chaff spreaders. The farmer's desire for increased machine productivity requires more engine power, much of which is consumed in propelling the combine and powering the harvesting equipment.

Typical harvesting equipment for combines are corn heads for harvesting corn and grain platforms for harvesting other grains. With a corn head the bulk of the crop material other than grain (MOG) is left in the field. With a corn head the ear of corn is snapped off the corn stalk and taken into the combine for threshing, separating and cleaning and the corn stalk is left in the field. With a grain platform the plant stalk is severed with the grain. The MOG associated with crop harvested by the grain platform must be separated from the grain. As such, the combine's power requirements when harvesting a crop with a grain platform is greater than harvesting corn with a corn head.

U.S. Pat. No. 5,878,557 discloses a combine that is powered by an internal combustion engine having an electronic engine controller, wherein the output of the engine is derated in response to combine usage requirements.

SUMMARY

It is an object of the present invention to match the engine power output with the power requirements of the combine as dictated by the harvesting assembly.

The combine of the present invention is provided with an internal combustion engine for driving the various assemblies on the combine. An electronic engine controller is used to monitor and control the operation of the engine. The electronic engine controller stores at least two power curves for controlling the engine. The first power curve has a higher horsepower output than the second power curve. A harvesting assembly detector signals the electronic engine controller with a corn head signal if a corn head is mounted to the combine, or a grain platform signal if a grain platform is mounted to the combine. If a corn head is mounted to the combine the electronic engine controller derates the engine and controls the engine in accordance with the second power curve. If the electronic engine controller receives a grain platform signal, the electronic engine controller controls the engine in accordance with the higher horsepower first power curve.

BRIEF DESCRIPTION OF THE DRAWINGS

FIG. 2 is a schematic of the operation of the present invention.

DETAILED DESCRIPTION

Figure 1:
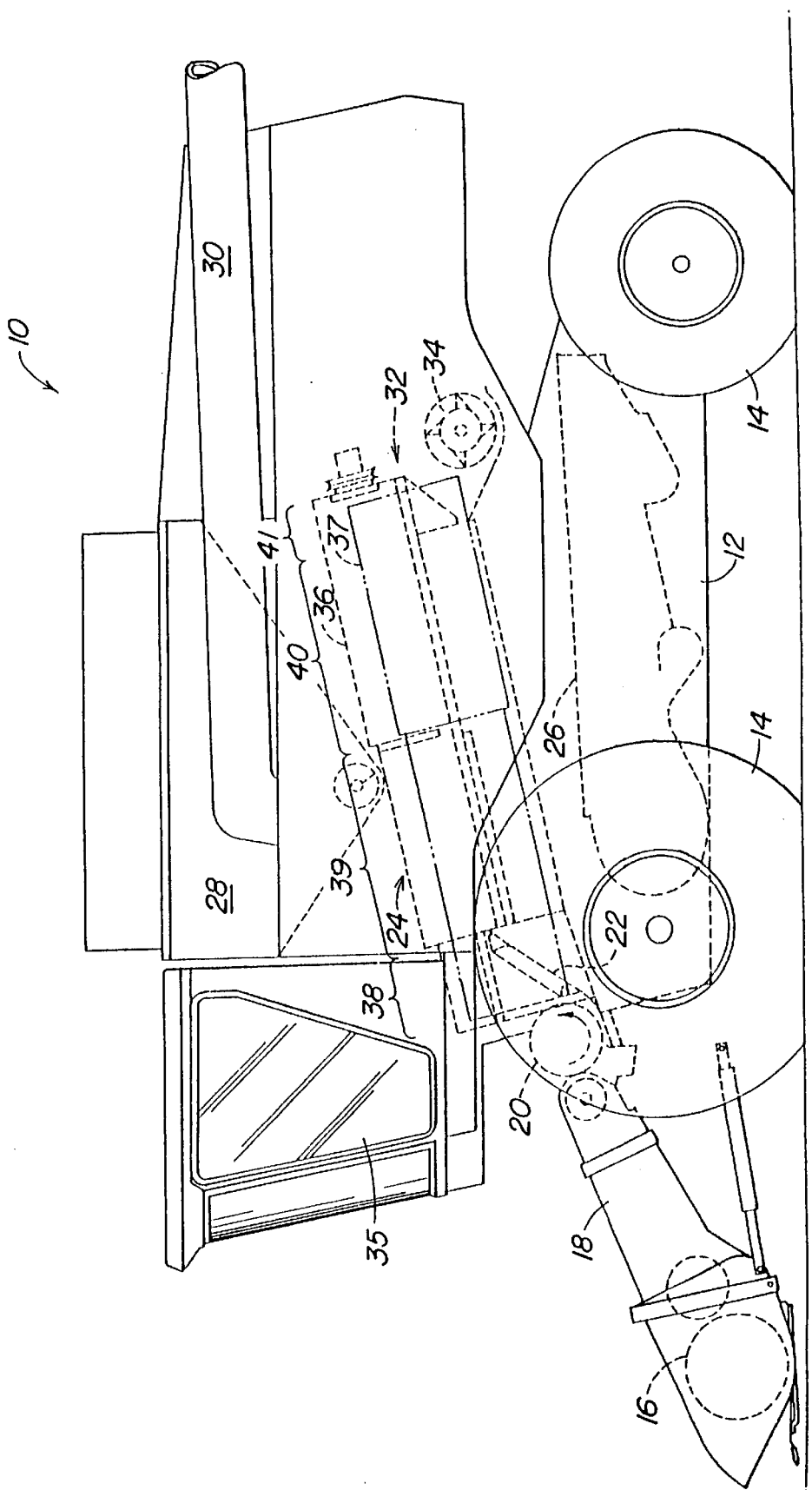
FIG. 1 is a semi-schematic side view of a combine.

FIG. 1 shows an agricultural combine 10 comprising a supporting structure 12 having ground engaging wheels 14 extending from the supporting structure. Although the combine is illustrated as having wheels, it could also have ground engaging tracks, either full tracks or half tracks. Harvesting assemblies are detachably mounted to the feederhouse 18. These harvesting assemblies may comprise a variety of harvesting configurations, including a grain platform, a corn head, a row crop header or a pickup platform. In FIG. 1, a harvesting assembly in the form of the illustrated grain platform 16 is used for harvesting a crop and directing it to a feederhouse 18. The feederhouse 18 contains a conveyor for conveying the harvested crop to a beater 20. The beater 20 directs the crop upwardly through an inlet transition section 22 to a rotary threshing and separating assembly 24. The illustrated threshing and separating assembly 24 is axially arranged in the combine 10, however, it could be in other orientations relative to the longitudinal axis of the combine. Although the present invention is described and illustrated as being used on a rotary threshing and separating assembly, it can also be used on a combine having a conventional transverse threshing cylinder and concave assembly.

The rotary threshing and separating assembly 24 threshes and separates the harvested crop material. Grain and chaff fall through grates on the bottom of the assembly 24 to a cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. It should be noted that the discharge beater 34 could also discharge crop material other than grain directly to a straw chopper. The operation of the combine is controlled from operator's cab 35.

The rotary threshing and separating assembly 24 comprises a cylindrical rotor housing 36 and a rotor 37 located inside the housing 36. The front part of the rotor and the rotor housing define the infeed section 38. Downstream from the infeed section 38 are the threshing section 39, the separating section 40 and the discharge section 41. The rotor 37 in the infeed section 38 is provided with a conical rotor drum having helical infeed elements for engaging harvested crop material received from the beater 20 and inlet transition section 22. Immediately downstream from the infeed section 38 is the threshing section 39. In the threshing section 39 the rotor 37 comprises a cylindrical rotor drum having a number of threshing elements for threshing the harvested crop material received from the infeed section 38. Downstream from the threshing section 39 is the separating section 40 wherein the grain trapped in the threshed crop material is released and falls through a floor grate in the rotor housing 36 to the cleaning system 28. The separating section merges into a discharge section 41 where crop material other than grain is expelled from the rotary threshing and separating assembly 24.

As discussed above the various crop processing assemblies are powered by an internal combustion engine 50, see FIG. 2. This engine 50 is electronically connected to an electronic engine controller 52. In turn the electronic engine controller is in communication with a harvesting assembly detector 54 through line 56. The harvesting assembly in FIG. 2 is a corn head 60 that is mounted to feederhouse 18. The detector 54 provides a corn head signal to the controller 52 as a corn head is mounted to the feederhouse. For the harvesting assembly illustrated in FIG. 1, the detector 54 provides a grain platform signal to the controller 52 as a grain platform is mounted to the feederhouse 18. The electronic engine controller stores at least two power curves in memory. The first power curve 58 has a higher horsepower output than the second power curve 59. In response to these harvesting assembly signals (corn head signal or grain platform signal), the controller 52 controls the engine based according to either the first power curve or the second power curve. If the harvesting assembly signal is a grain platform signal, the electronic controller 52 operates the engine 50 in accordance with the higher horsepower first power curve 58. If the harvesting assembly signal is a corn head signal, the electronic controller 52 operates the engine 50 in accordance with the second power curve 59.

The harvesting assembly detector 54 can comprise a number of configurations. It can be a simple two-position switch 70 located in the cab 35 and activated by the operator. It can be a switch located on the feederhouse, as illustrated in FIG. 2, that is activated when one of the two harvesting assemblies is mounted to the feederhouse. In addition, the detection can be accomplished by the electronic hook up between the harvesting assembly and the combine. More specifically, modern combines have electronic monitoring systems. These monitoring systems use a CAN bus signaling methodology that can be used to signal the electronic engine controller.

The first power curve 58 and the second power curve 59 each may comprise a family of power curves. Other monitoring systems on the combine may dictate which of the power curves from the selected family would be used in a particular application or configuration. For example, when operating a grain platform a moisture sensor may be used to monitor the moisture content of the harvested crop. The moisture signal of the moisture sensor may dictate a specific power curve from the grain platform family of power curves. The opposite may also be true where the harvesting assembly configuration is used to select a specific power curve from a family of power curves.

The present invention should not be limited by the above described embodiment, but should be limited solely by the claims that follow.

What is claimed is:

1. An agricultural combine for harvesting, threshing, separating and cleaning an agricultural crop, said combine comprising;

a supporting structure;

ground engaging means extending from the supporting structure for transporting the supporting structure across a field;

a harvesting assembly for harvesting a crop is mounted to the supporting structure, the harvesting assembly being one of a corn head and a grain platform;

a harvesting assembly detector is mounted to the supporting structure and provides a corn head signal when the corn head is mounted to the supporting structure and a grain platform signal when the grain platform is mounted to the supporting structure;

an engine is mounted to the supporting structure for powering the combine; and an electronic engine controller is connected to the engine for controlling the maximum power level of the engine, the electronic controller has a first power curve and a second power curve stored in memory, the electronic engine controller is connected to the harvesting assembly detector, if the electronic engine controller receives the grain platform signal from the harvesting assembly detector, the electronic engine controller operates the engine in accordance with the first power curve, if the electronic engine controller receives the corn head signal from the harvesting assembly detector, the electronic engine controller operates the engine in accordance with the second power curve.

2. An agricultural combine as defined by claim 1 wherein the first power curve has a higher horsepower output than the second power curve.

3. An agricultural combine as defined by claim 2 wherein the first power curve comprises a first family of power curves and the second power curve comprises a second family of power curves.

4. An agricultural combine as defined by claim 2 wherein the harvesting assembly detector automatically signals the respective grain platform signal and corn head signal to the electronic engine controller in response to the respective harvesting assembly being mounted to the combine.

5. An agricultural combine as defined by claim 2 wherein the harvesting assembly detector is a manual switch triggered by a combine operator.

6. A method of controlling an internal combustion engine of an agricultural combine, the combine being provided with an electronic engine controller for controlling the internal combustion engine, the method comprising the following steps:

storing a first power curve in an electronic engine controller;

storing a second power curve in the electronic engine controller;

signaling the electronic engine controller by a harvesting assembly detector with one of a grain platform signal and a corn head signal;

controlling the internal combustion engine in accordance with the first power curve if the electronic engine controller receives a grain platform signal;

controlling the internal combustion engine in accordance with the second power curve if the electronic engine controller receives a corn head signal.

7. A method as defined by claim 6 wherein the harvesting assembly detector automatically signals the electronic engine controller of the type of harvesting assembly mounted to the combine.

8. A method as defined by claim 6 wherein a combine operator through the harvesting assembly detector manually signals the electronic engine controller of the type of harvesting assembly mounted to the combine.

* * * * *